Feb. 25, 1947.  D. D. GRIEG  2,416,306
DEMODULATOR
Filed Sept. 28, 1942  5 Sheets-Sheet 1

INVENTOR
DONALD D. GRIEG
BY
ATTORNEY

Feb. 25, 1947.                D. D. GRIEG                2,416,306
                              DEMODULATOR
                        Filed Sept. 28, 1942          5 Sheets—Sheet 5

INVENTOR
DONALD D. GRIEG
BY
ATTORNEY

Patented Feb. 25, 1947

2,416,306

UNITED STATES PATENT OFFICE 2,416,306

DEMODULATOR

Donald D. Grieg, Forest Hills, N. Y., assignor to Federal Telephone & Radio Corporation, a corporation of Delaware Application September 28, 1942, Serial No. 459,959

27 Claims. (Cl. 250—27)

This invention relates to radio reception of time modulated pulse energy and more particularly to a method and means for demodulating or translating time modulated pulse energy into amplitude modulated energy. Examples of pulse modulation systems to which this invention relates are disclosed in United States patents to A. Reeves No. 2,266,401 and to W. A. Beatty No. 2,256,336; United States patent to E. Deloraine No. 2,262,838; in copending application of E. Deloraine and E. Labin Serial No. 425,108, filed December 31, 1941, and my copending application, Serial No. 458,854, filed September 18, 1942.

As disclosed in these patents and applications, both amplitude and time modulation of pulses may be performed simultaneously. This invention, however, is concerned with the demodulation of the time modulation of the pulses. The time modulation of pulses may be obtained by time displacement of recurring pulses or by relative displacement of the pulses by pairs of pulses. This pulse displacement, either by single pulse or by pairs of pulses may be used to define signal increments. The displacement of single pulses may be relative to a normal unmodulated pulse position or a synchronizing pulse position. Where pulse pairs are used, one of each pair may be fixed as to recurrence while the position of the other pulse varies relative thereto, or the pulses may both move simultaneously toward and away from each other.

It is one of the objects of this invention to provide an improved method and inexpensive means for translating time modulated impulse energy as described above into amplitude modulated energy.

Another object of this invention is to provide a method and means for demodulating time modulated pulse energy to provide after proper filtering to remove carrier pulses, can be applied directly to an audio-amplifier and/or speaker.

Another object of this invention is to reshape the carrier pulses forming the amplitude envelopes after demodulation so as to increase the energy thereof.

A further object of this invention is to effect translation of time modulated energy into amplitude modulated energy by using a single vacuum tube.

Still another object of the invention is to provide a method and means for demodulating 100% time modulated pulse energy The method of this invention involves generating or synchronizing with the frequency of the pulse occurrence of the time modulated pulses, a source of wave energy either sinusoidal or sawtooth or other shape having recurring inclined portions, the period of which is comparable to the time spacing of the pulses. This wave and the time modulated pulses are then combined, the pulses being superimposed on the wave at points along the inclined portions thereof according to the time displacement of the pulses. This produces output carrier pulse energy having amplitudes according to the modulated displacement of the time modulated pulses.

The wave energy may be generated independently of the time modulated pulse source and synchronized therewith, or the time modulated pulses may be caused to generate or control the generation of the wave.

The combined energy of the wave and the time modulated pulses are preferably subjected to a clipping operation whereby a portion of the combined energy is clipped off below a predetermined amplitude. This clipped off portion is preferably determined by the amplitude of the combined energy occurring for unmodulation or for the maximum negative signal potential. The pulse energy exceeding this amplitude level comprises the carrier pulses forming the output amplitude envelope.

To provide substantial energy for the amplitude envelope output, the carrier pulses are subjected to a pulse shaping operation whereby the trailing edges of the pulses are given gradual slope thereby increasing the width and therefore the energy of the pulses. This output amplitude envelope may be fed directly, after passing through a suitable filter to remove carrier pulse harmonics, to an audio-amplifier and/or speaker.

For a further understanding of the method and of means by which the method may be practiced, reference may be had to the following detailed description to be read in connection with the accompanying drawings, in which, Fig. 1 is a schematic illustration of one form of apparatus by which the method of this invention may be practiced;

Figure 1:
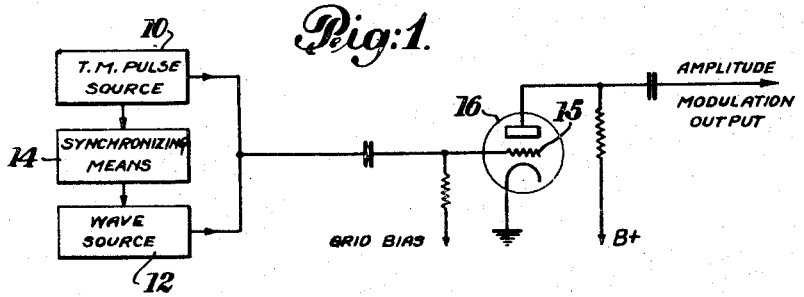

Referring to Fig. 1 of the drawing, 10 represents a source of time modulated pulse energy which may comprise means for receiving such energy over an antenna or from a modulator. A wave source 12 provides either a source of sinusoidal wave energy or saw-tooth wave energy or any other wave form having recurring inclined portions, whichever may be available or desired. The source 12 may comprise the means for generating such wave energy. The wave source 12 may be synchronized with the pulse source 10 or the generation thereof may be controlled by the pulses of the source 10 through known synchronizing means 14. Should the wave energy be sinusoidal, a turnable shock excitable inductance-capacity circuit may be used, and if the wave is a saw-tooth, the pulses may be used to control the generation thereof such as by means of a known relaxation oscillator. In either case, the wave generated must have recurring inclined portions and have a period comparable with the modulating displacement of the pulses. If the saw-tooth wave is generated in response to the pulse source, a phase shifter may be associated with the wave generating means of source 12 to shift the phase thereof with respect to the time displacement of the pulses.

The pulses and the wave energy are combined and clipped by applying the combined energy to a vacuum tube 16 such as a triode. The grid 15 is biased preferably at a value such that the combined amplitudes of the sources 10 and 12 yield zero output energy occurring during one modulation displacement extreme. Thus for any modulating displacement of the pulses, such displacement will vary the superimposing relation of the pulse with respect to the inclined portion of the wave.

Figure 2:
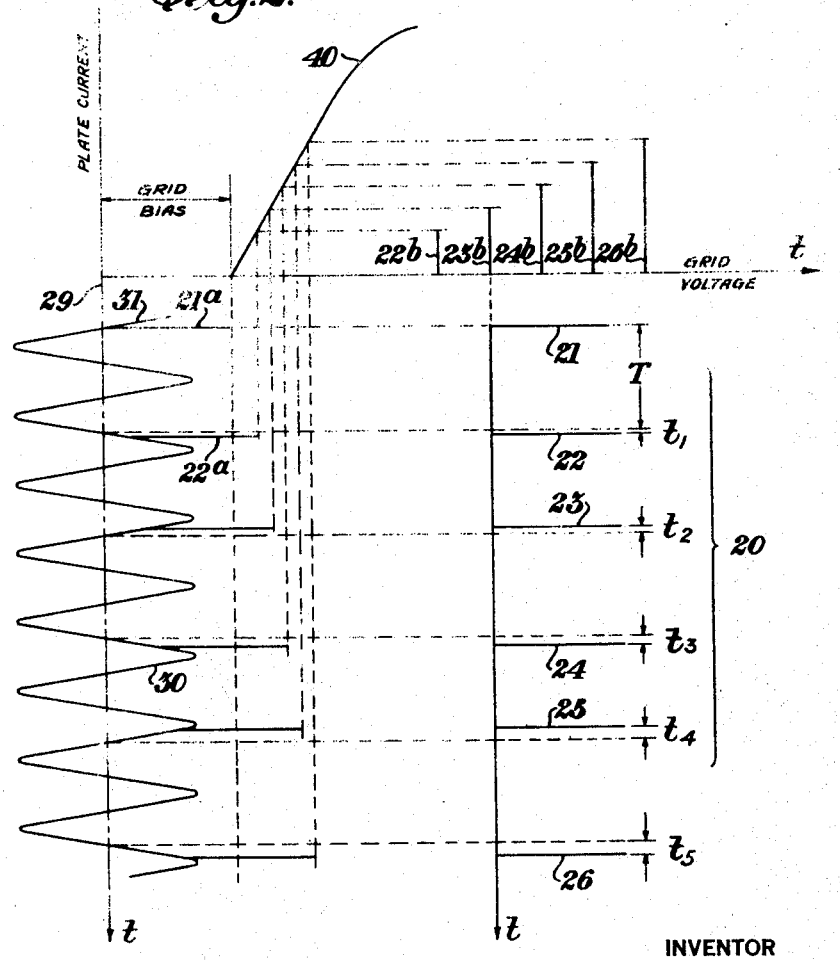
Fig. 2 is a graphical illustration of the combining and clipping features of the invention as performed in the apparatus illustrated in Fig. 1.

These superimposing and clipping features of the invention are illustrated in Fig. 2. The time modulated pulses are shown at 20, the pulse 21 being shown in one extreme time position and the pulses 22, 23, 24 and 25 being displaced at successively larger time intervals $t_1$, $t_2$, $t_3$ and $t_4$ toward opposite extreme time position represented by pulse 26 displaced a time interval $t_5$. In actual practice the displacement will be so small as not to be detected on the usual oscillograph. For transmission at 6 kilocycles, for example, the interval T between adjacent pulse positions is about 80 microseconds while the maximum displacement $t_5$ is from about 1 to 2 microseconds thereabouts. These pulses are shown projected on a sinusoidal wave 30 from the source 12. The inclined or linear portion 31 is shown to be so related with respect to the pulse 21 that the pulse is superimposed thereon at the intersection of the zero axis 29 of the wave 30. It will be understood, however, that this relation is chosen for purposes of illustration and that the phase of the curve may be such that the unmodulated pulse will superimpose at a different point on the linear part of the curve. As hereinbefore stated, this superimposed relation of the pulse 21 representing one extreme of modulation provides an amplitude at which the tube 16 may be biased. The tube plate current-grid voltage characteristic 40 is shown in accordance with such grid bias. The peak of the superimposed pulse energy 21a thus just reaches the value of the grid bias and no energy passes through the tube. The time displacement $t_1$ of the pulse 22, however, superimposes the energy of the pulse 22 at a higher position on the wave thereby producing a combined energy 22a which exceeds the amplitude of the grid bias. Projecting the peak of the energy 22a on the tube characteristic curve 40, a resulting carrier pulse amplitude 22b is passed to the plate of the tube. Likewise, the pulses 23, 24 and 25 when superimposed on the curve 30 provide amplitudes corresponding to their respective time displacement, which when projected upon the curve 40 provide carrier pulses 23b, 24b, and 25b. The pulse 26 which is displaced to an extreme position opposite that of pulse 21 as indicated by the maximum time interval $t_5$, provides a carrier pulse 26b which is of still greater amplitude than the preceding carrier pulses.

It will be clear from the foregoing that variation of the time displacement of pulses between the minimum displacement position of the pulse 21 on the one hand and the maximum displacement of the pulse 26 on the other hand will provide carrier pulses having corresponding amplitude variations.

Figure 6:
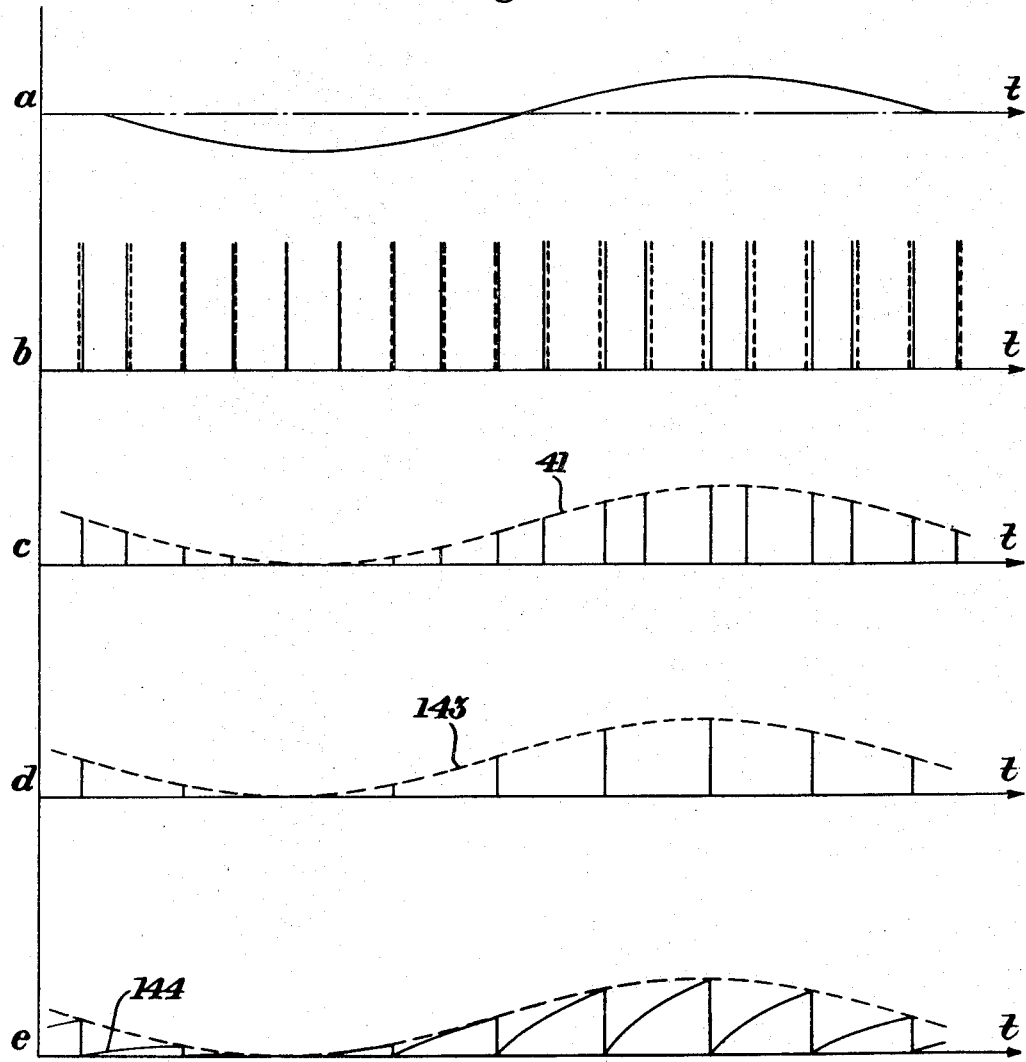

Should the time modulated pulses be modulated in accordance with a sine wave signal such as indicated at $a$ in Fig. 6, the time modulated pulses will assume the displacement relationship shown at $b$ (Fig. 6). The carrier pulses produced by demodulation as described in connection with Figs. 1 and 2 are indicated at $c$ (Fig. 6) and as shown provide an amplitude envelope 41.

Where the generator of the wave source 12 produces a saw-tooth wave 42 such as indicated at $b$ (Fig. 5), the wave may be adjusted for phase relationship with the source of time modulated pulses so that the pulses when combined with the wave are each superimposed upon an inclined portion 43 of a saw-tooth. Since the inclined portions of the saw-teeth are always passing from negative to positive or from one potential to another of higher value during the time displacement intervals $t_1$, $t_2$, etc., of the pulses, alternate pulses such as 72 and 73 will be given high and low amplitudes respectively as indicated at 44 and 45. Thus, alternate pulses will provide the carrier pulses which form the amplitude envelope as determined by the cut-off potential 46 of the tube. A resulting amplitude envelope 143 in accordance with wave $b$ (Fig. 5) is indicated by the envelope wave $d$ (Fig. 6).

Figure 3:
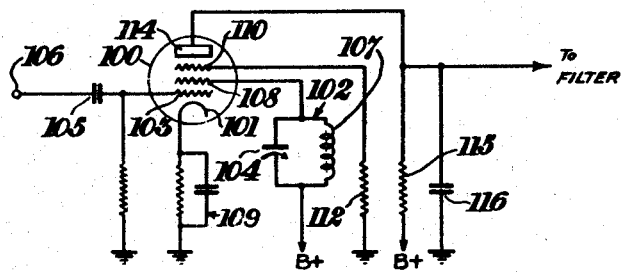
Figs. 3 and 4 are schematic wiring diagrams of additional forms of apparatus by which the method can be practiced.

Another form of demodulator of this invention is shown in Fig. 3. This form is built about a pentode tube 100. The cathode 101 of the tube is self-biased to cut-off by a resistance-capacitance circuit 109. The grid 103 is connected by the usual grid leak and a condenser 105 to a grid terminal 106 at which time modulated pulse energy is received. Connected to the screen grid 108 is a shock excitable tuned circuit 102 having a variable condenser 104 and an inductance 107. A positive potential for the screen grid is provided by a connection B+ at the opposite side of the tuned circuit 102. To the suppressor grid 110 I preferably connect a high value of grid leak 112. The plate 114 is connected in circuit with a resistance 115 across which the output is obtained. Shunting the resistance 115 is a condenser 116, the time constant of which in conjunction with the resistance 115 is of the same order as the time modulated pulse period.

Figure 5:
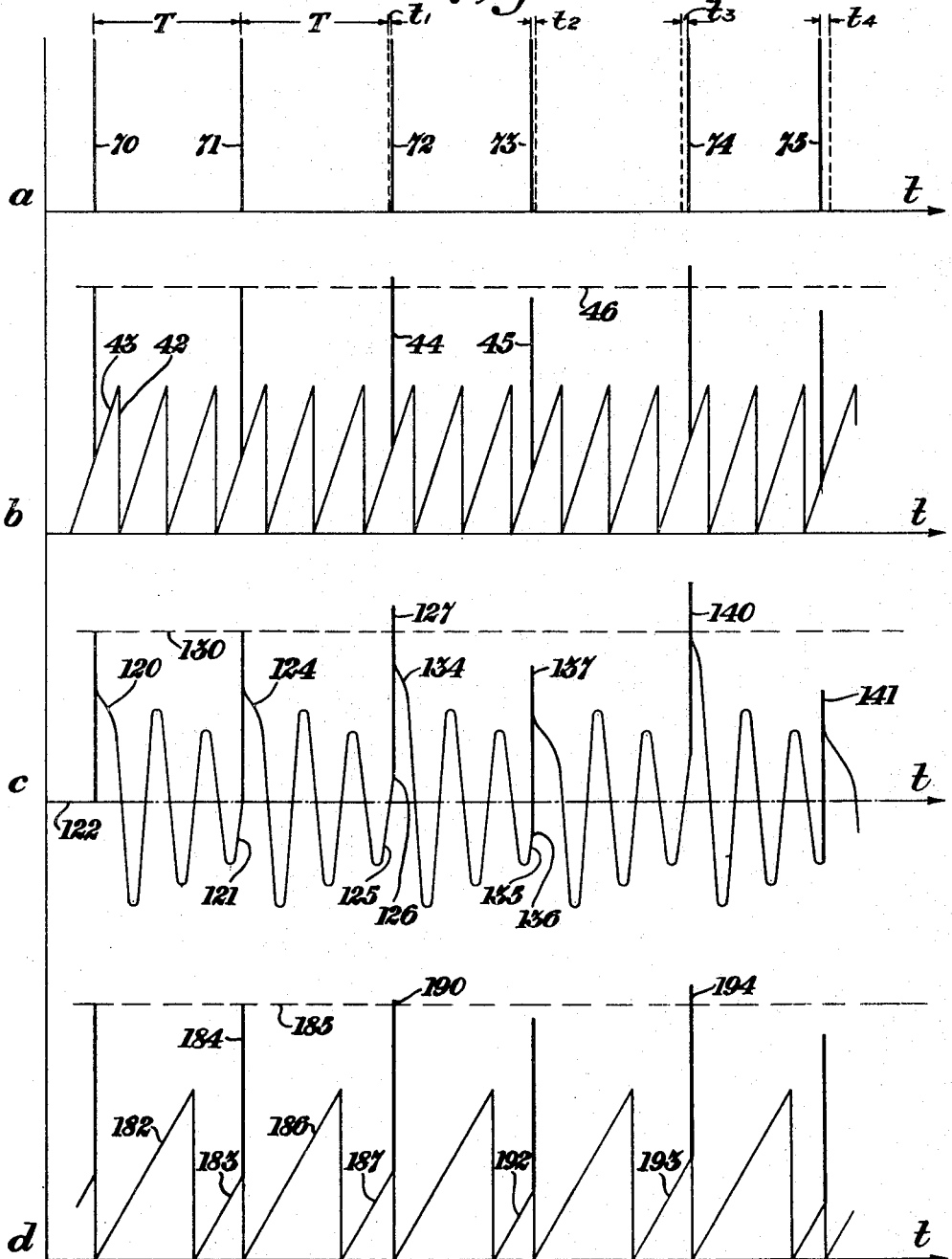
Figs. 5, 6, 7, 8 and 9 are graphical illustrations used in explanation of the operation of the different forms of apparatus.

In operation of the circuit of Fig. 3, assuming that the time modulated pulses applied thereto are the pulses 70 to 75 of part $a$ of Fig. 5, and the tuned circuit 102 is tuned to a frequency of approximately three times the time modulated pulse interval T, the energy combining action performed in the tube 100 is substantially as shown indicated by the curve at $c$, Fig. 5. When the pulse 70 is applied to the grid 103, the amplitude thereof is such as to effect a passage of energy to the screen grid 108 thereby establishing an oscillation wave 120 in the circuit 102. The voltage of this oscillation is applied to the tube at the screen grid 108. When the linear portion 121 of the curve is traversing the zero axis 122, the next unmodulated pulse 71 will be received on the grid 103 thereby producing a new wave oscillation 124. The linear portion 125 of the curve 124 traverses the axis 122 a time interval $t_1$ prior to the application of the pulse 72. Thus the linear portion will have reached a positive potential 126 before the pulse 72 is received. The potential 126 added to the potential of the pulse 72 produces a combined pulse amplitude 127 which is greater than the amplitude of the pulse 72. The self-biasing of the tube 100 is such that the tube will not pass current to the plate 114 until the pulse potential applied to the grid 103 of the screen grid 108 exceeds a predetermined level such as indicated by the amplitude line 130. Thus where the potential 127 exceeds the potential 130, current will flow in the plate circuit corresponding to the amount which the pulse 127 exceeds the potential 130.

This greater potential 127 will in turn produce a wave oscillation 134 which has greater swings than the preceding waves 120 and 124. The next pulse 73 which is displaced toward the pulse 72 an interval $t_2$ will be superimposed upon the inclined portion 135 at a point 136 on the negative side of the zero axis 122. This negative potential is subtracted from the energy of the pulse 73 thereby resulting in a combined pulse potential 137 which does not exceed the level 130. In like manner, the pulses 74 and 75 which are displaced at successively greater time intervals $t_2$ and $t_3$ produce high and low pulse potentials 140 and 141, respectively, the amount of the pulse potential 140 above the level 130 being in proportion to the time displacement $t_3$ and the amount of the pulse 141 below the level 130 being in proportion to the time displacement of the pulse 75.

From the foregoing, it will be clear that pulses time modulated by a sinusoidal modulating signal as indicated at $a$ and $b$ (Fig. 6) will produce a series of carrier pulses as indicated at $d$ thereby producing an envelope 143. The carrier pulses shown at $d$, however, are very slender and each pulse, therefore, provides spurts of energy of very short duration. The provision of the time constant combination composed of resistance 115 and condenser 116, however, increases the envelope energy, that is, this part of the circuit transforms the pulses into substantially saw-teeth waves 144 for each pulse as indicated by the carrier pulses at $e$ of Fig. 6. This method provides an envelope similar to the method described in my patent application Serial No. 458,854, filed September 18, 1942.

I have found that by connecting the suppressor grid 110 directly to ground, that the tube characteristic is such that the circuit will provide demodulation of about 50 to 60 percent. I find, however, that the percentage demodulation can be increased to 100 percent by connecting the suppressor grid 110 through the grid leak 112 of high value. The use of this grid leak alters the tube characteristics in response to the oscillating potential of the circuit 102 and thereby provides a different plate current-grid voltage characteristic for each different time displacement of the time modulated pulses applied thereto.

For best conversion efficiency the tuned circuit 102 indicated in Fig. 3 should be of a high "Q" type. This high "Q" may be obtained by the simple LC combination indicated or alternately by connecting the LC combination in conjunction with known "negative resistance" circuits such as a feedback circuit adjusted to a non-self-oscillatory condition. If this "negative resistance" is added, action similar to that illustrated in Fig. 2 will be obtained, that is, the base wave will have substantially constant amplitude.

While I have shown the circuit of Fig. 3 provided with a tuned circuit 102 for the purpose of providing a sinusoidal base wave, the circuit may instead be provided with a saw-tooth generator adapted to provide a saw-tooth wave of a selected frequency so that a sawtooth slope will occur in timed relation with the pulse period. For purposes of illustration, I have shown in block form in Fig. 4 a saw-tooth generator 180 connected to the screen grid of the pentode tube 100. The saw-tooth generator 180 may be of any known form of relaxation oscillator whereby the pulses applied to the grid 103 will cause energy to be applied to the saw-tooth generator to terminate any saw-tooth being formed at that instant. In Fig. 5 a saw-tooth wave $d$ is shown to have such a frequency as to normally produce saw-teeth 182 at a period equal to about two-thirds of the time interval T, assuming that the pulse modulation shown at $a$ (Fig. 5) is supplied to the grid 103. Thus, when the saw-tooth 182 is formed beginning with the position of the pulse 70, the saw-tooth is terminated by the generator and the next succeeding saw-tooth 183 commences prior to the reception of the pulse 71. The pulse 71 combines with the potential of the saw-tooth 183 at the amplitude thereof at the occurrence of the pulse 71 thereby producing a combined pulse potential 184. The tube 100, however, is biased so as not to pass current to the plate unless the combined pulse potential exceeds the level 185. The pulse 71 thus does not produce a carrier pulse above the level 185. This pulse terminates the saw-tooth 183 permitting the generator to commence the generation of the next succeeding saw-tooth 186. The saw-tooth 186, however, is terminated by the generator since the period thereof is shorter than the distance between adjacent pulses. The next saw-tooth 187 combines with the pulse 72 and this combined energy exceeds the level 185 since the saw-tooth 187 has had a time interval $t_1$ in which to build up beyond the amplitude of the saw-tooth 183. This provides a carrier pulse 190. The pulse 72 terminates the pulse 187 and the saw-tooth generator continues to generate saw-teeth until the saw-tooth 192 is formed during the reception of the pulse 73. The saw-tooth 192, however, is of smaller amplitude than the tooth 183 since the time interval between the pulses 72 and 73 is decreased by a time interval $(t_1+t_2)$. The next succeeding pulse 74, however, occurs at a higher amplitude on a subsequent saw-tooth 193 thereby providing a carrier pulse 194. It will thus be clear that carrier pulses will be formed one for each pair of pulses in accordance with the time displacement thereof.

Figure 4:
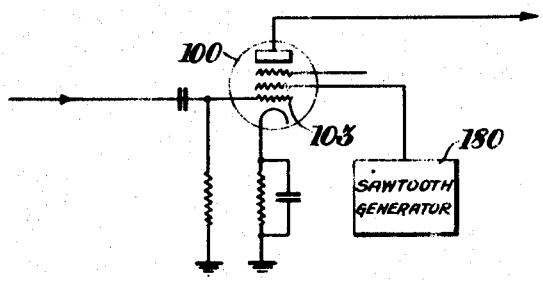

In connection with the generation of the base wave either independently or in conjunction with the circuits of Figs. 3 or 4, it should be understood that the frequency of the base wave is not limited to that indicated on the illustrative diagrams but may be any frequency and phase capable of producing the desired demodulation. Preferably, the period of the base wave should be such that the linear portion of this wave occupies the same time as the maximum to minimum modulation displacement.

Figure 7:
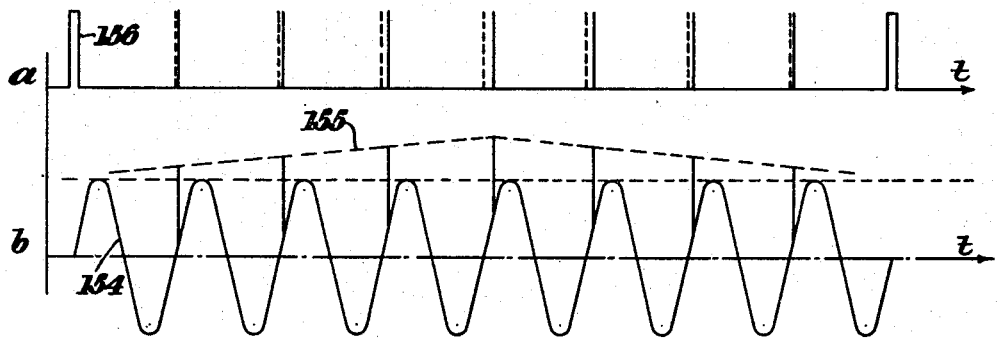

As hereinbefore stated, the method of demodulation performed in accordance with this invention is applicable to various kinds of pulse modulations. In Fig. 7, a train of pulses is shown wherein each pulse is displaced relative to a normal unmodulated position indicated by broken lines. This type of time modulation may be demodulated in accordance with the different forms of apparatus of this invention. For the form shown in Fig. 1, an independent wave source 154 may be used as a base wave upon which the time modulated pulses are superimposed. This provides a wave envelope 155 as indicated at b (Fig. 7). Should it be desirable to generate or control the base wave 154 in accordance with the source of time modulated pulses, pilot pulses 156 may be provided at predetermined intervals by which the wave 154 may be produced by shock excitation or if produced by independent means, it may be synchronised by the pilot pulses by known synchronizing means. The pilot pulses for this purpose may either be pulses of greater amplitude than the other pulses of the wave train, or they may be of greater width.

Figure 8:
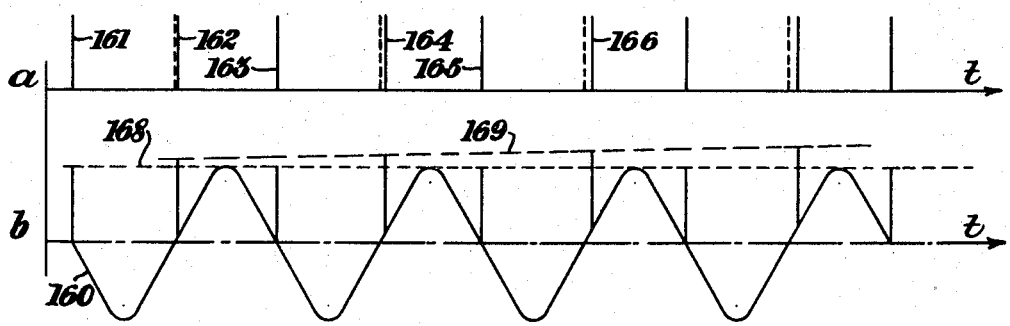

In Fig. 8, I have shown another type of time modulated pulse energy wherein alternate pulses 161, 163, 165, etc. occur at fixed time intervals and the other pulses 162, 164, 166, etc., are displaced in time in accordance with signal increments. The base wave 160 is shown to be independently generated and it will be understood that it may have any frequency desired so long as it provides recurring inclined portions in timed relation with respect to the period of the pulses. The alternate pulses 161, 163, 165, etc., for the frequency chosen for illustration do not exceed the cut-off potential 168. The time displaced pulses 162, 164, 166, etc., exceed the potential 168 in proportion to the displacement of the pulses thereby providing carrier pulses forming an envelope 169.

Figure 9:
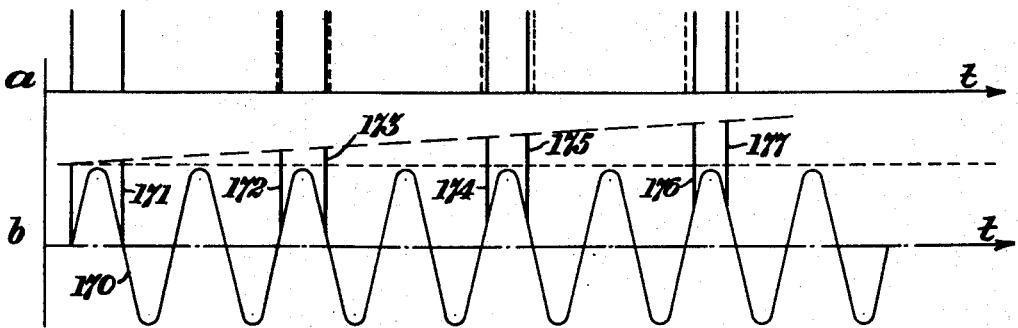

In Fig. 9, part a, the pulses while modulated by pairs, that is, the pulses of each pair are displaced toward and away from each other, the pairs are widely spaced apart. As indicated in part b, these pulses may be combined with a base wave 170 whereupon the combined potentials of the pulses and the wave produce carrier pulse energy representing signal increments by pulses 171, 172, 173, etc.

While I have shown and described several forms of apparatus by which the method of my invention may be practiced, I recognize that many variations both in the method and in the forms of apparatus shown may be provided without departing from the invention. It is to be understood, therefore, that the forms herein shown and described are to be regarded as illustrative of the invention only and not as restricting the appended claims.

What I claim is:

1. A method of demodulating a series of time modulated energy pulses related in their unmodulated condition according to a given recurrence pattern, but time displaced therefrom by modulation energy, which comprises creating a wave having a given shape and a timing conforming to said pattern recurrence, and superimposing said wave and said time modulated energy pulses to derive energy variations corresponding to those of the modulating energy.

2. A method of demodulating a series of time modulated discrete energy pulses, recurring when unmodulated according to a given pattern but time displaced therefrom by modulating energy, which comprises producing a wave varying in amplitude in a predetermined cycle conforming to said pattern, and synchronized with the recurrence of said given pattern, and combining in amplitude relationship said wave and said time modulated energy pulses to derive an energy form corresponding to the modulating energy.

3. A system for demodulating the time displacement of time modulated pulse energy wherein at least certain of the pulses are displaced from unmodulated time positions in accordance with a signal, comprising means for generating a wave having cyclic amplitude variations and having a recurrence pattern in synchronism with the unmodulated timing of said pulses, and means for determining the degree of time displacement of said pulse energy by combining in amplitude the energy of the displaced pulses and said wave.

4. A demodulator for translating intelligence from a series of time modulated pulses having a recurrence pattern in their unmodulated condition but displaced from said pattern in their modulated condition, comprising means for creating a wave bearing a fixed time relationship to said recurrence pattern, and means for determining the degree of modulation of said displaced pulses by superimposing the energy of said modulated pulses on said wave.

5. A method of translating the time displacement of time modulated pulse energy wherein at least certain of the pulses are displaced from unmodulated time positions in accordance with substantially the instantaneous amplitude of an intelligence signal, into amplitude modulated pulse energy comprising generating in synchronism with the unmodulated timing of said pulses wave energy having recurring inclined portions, combining the wave energy and the time modulated pulse energy, the synchronous relationship of the wave with respect to the unmodulated timing of the pulses causing the time modulated pulses to add to the wave at points along inclined portions thereof in accordance with the time displacement of the pulses, whereby the resulting pulse peaks correspond in amplitude substantially directly to the time displacement of the corresponding pulse energy.

6. The method defined in claim 5 wherein the wave energy generated is sinusoidal.

7. The method defined in claim 5 wherein the wave energy generated is generally of sawtooth shape.

8. The method defined in claim 5 wherein the generation of wave energy is controlled by the time modulated pulse energy.

9. The method defined in claim 5 wherein the time modulated pulse energy is provided with periodically occurring pilot pulses and said pilot pulses are used to control the synchronism of the wave energy with respect to the period of the time modulated pulses.

10. A method of translating the time displacement of time modulated pulse energy wherein at least certain of the pulses are displaced from unmodulated timing position in accordance with substantially the instantaneous amplitude of an intelligence signal, into amplitude modulated pulse energy comprising generating in synchronism with the unmodulated timing of said pulses, a wave energy having recurring inclined portions, combining the wave energy and the time modulated pulse energy, the synchronous relationship of the wave with respect to the unmodulated timing of the pulses causing the time modulated pulses to add to said wave at points along inclined portions thereof in accordance with the time displacement of the pulses, clipping off the portion of the combined energy below a predetermined amplitude so that the output pulses have amplitudes which correspond to the time displacement of the time modulated pulses, and reshaping the pulses to increase the energy content thereof.

11. A method of translating the time displacement of time modulated pulse energy wherein at least certain of the pulses are displaced from unmodulated timing position in accordance with substantially the instantaneous amplitude of an intelligence signal, comprising generating in response to a pulse from said energy a base wave having an inclined portion, applying to said wave the next pulse of said source at a point along said inclined portion in accordance with the time displacement of the pulse, the energy of the pulse acting to add to the potential of said wave to produce an amplitude corresponding to the time displacement of the pulse and to cause initiation of a new base wave to which the next succeeding pulse of said source is applied.

12. A demodulator for translating the time displacement of time modulated pulse energy, wherein at least certain of the pulses are displaced from unmodulated timing position in accordance with substantially the instantaneous amplitude of an intelligence signal, into amplitude modulated pulse energy comprising means to generate, in synchronism with the unmodulated timing of said pulses, wave energy having recurring inclined portions, means for combining the wave energy and the time modulated pulse energy, the synchronous relationship of the wave with respect to the unmodulated timing of the pulses causing the time modulated pulses to add to the wave energy at points along inclined portions of said wave in accordance with the time displacement of the pulses, whereby the resulting pulse peaks correspond in amplitude substantially directly to the time displacement of the corresponding pulse energy.

13. The demodulator defined in claim 12 wherein the wave generating means comprises a tuned circuit shock excitable in response to the energy of the time modulated pulses.

14. The demodulator defined in claim 12 wherein energy combining means comprises a vacuum tube.

15. A demodulator for translating the time displacement of time modulated pulse energy wherein at least certain of the pulses are displaced from unmodulated timing position in accordance with substantially the instantaneous amplitude of an intelligence signal, into amplitude modulated energy comprising means responsive to the pulses of said source to produce in synchronism with the unmodulated timing of said pulses a wave having recurring inclined portions, means including a vacuum tube for combining the wave energy and the time modulated pulse energy, the synchronous relationship of the wave with respect to the unmodulated timing of the pulses causing the time modulated pulses to add thereto at points along the inclined portions thereof in accordance with the time displacement of the pulses, thereby producing output pulse energy having amplitudes corresponding to the time displacement of the time modulated pulses, and means to bias the tube so that it will pass output pulse energy only when the combined energy exceeds a predetermined amplitude.

16. The demodulator defined in claim 15 wherein the vacuum tube is a triode.

17. The demodulator defined in claim 15 wherein the vacuum tube is a pentode.

18. The demodulator defined in claim 15 in combination with pulse shaping means whereby the output pulses are given a generally sawtooth shape thereby providing the output pulses with increased energy.

19. The modulator defined in claim 15 wherein the biasing means is adjustable to such a value that the predetermined amplitude is equal to the amplitude of the combined energy formed when a pulse is in one extreme position of modulation.

20. A demodulator for translating the time displacement of time modulated pulse energy, wherein the pulses are displaced from unmodulated timing position in accordance with the instantaneous amplitude of an intelligence signal, into amplitude modulated energy comprising means to generate wave energy of generally sawtooth shape in synchronism with the frequency of said pulse energy, means for combining the wave energy and the time modulated pulse energy so that the pulses are in phase relation with inclined portions of said wave thereby producing output pulse energy having amplitudes corresponding to the time displacement of the pulses of said source, and means for clipping off the portion of the combined energy below a predetermined amplitude thereby providing carrier pulses forming amplitude envelopes according to said intelligence signal.

21. The demodulator defined in claim 12 wherein the means for combining the wave energy and the time modulated pulse energy includes a vacuum tube having at least a cathode, a grid and a third electrode, and means for connecting the wave generating means in circuit with said third electrode.

22. The demodulator defined in claim 12 wherein the means for combining the wave energy and the time modulated pulse energy includes a vacuum tube having at least cathode, grid, screen grid and plate electrodes, and means for connecting the wave generating means in circuit with said screen grid electrode.

23. A demodulator for translating the time displacement of time modulated pulse energy into amplitude modulated energy comprising means to generate in synchronism with the frequency of said pulse source a wave having recurring inclined portions, a pentode tube having cathode, grid, screen grid, suppressor grid and plate electrodes, means connecting said grid to said source, means connecting said wave generating means to said screen grid, a grid leak resistance, and means connecting said resistance in circuit with said suppressor grid.

24. The demodulator defined in claim 23 in combination with means for biasing the tube so that it will pass combined energy only when the energy exceeds an amplitude equal to the combined energy formed when a pulse is in one extreme position of modulation.

25. A method of translating the time displacement of time modulated pulse energy, wherein at least certain of the pulses are displaced from unmodulated time positions in accordance with substantially the instantaneous amplitude of an intelligence signal, into amplitude modulated pulse energy, comprising generating, in synchronism with the unmodulated timing of said pulses, wave energy having recurring inclined portions, combining the wave energy and the time modulated pulse energy, the synchronous relationship of the wave with respect to the unmodulated timing of the pulses causing the time modulated pulses to add to the wave at points along inclined portions thereof in accordance with the time displacement of the pulses, and threshold clipping portions of the pulses from said wave energy whereby the resulting pulse portions correspond in amplitude substantially directly to the time displacement of the corresponding pulse energy.

26. The method defined in claim 25 wherein the time modulation of pulses comprises relative displacement between the pulses of pairs of pulses so that signal increments are representable by pairs of pulses, and the frequency of the wave generated is such as to provide at least one combined energy pulse per pulse pair extending in amplitude above the level of said threshold clipping operation in accordance with the relative time displacement of the pulses of each pair.

27. The method as defined in claim 25 wherein the maximum amplitude of the energy clipped off from the combined energy is equal to the amplitude thereof at one extreme position of time modulation.

DONALD D. GRIEG.

REFERENCES CITED

The following references are of record in the file of this patent:

UNITED STATES PATENTS

| Number | Name | Date |
|---|---|---|
| 2,166,688 | Kell | July 18, 1939 |
| 2,255,403 | Wheeler | Sept. 9, 1941 |
| 2,227,076 | Geiger | Dec. 31, 1940 |
| 2,277,000 | Bingley | Mar. 17, 1942 |